Figure 1:
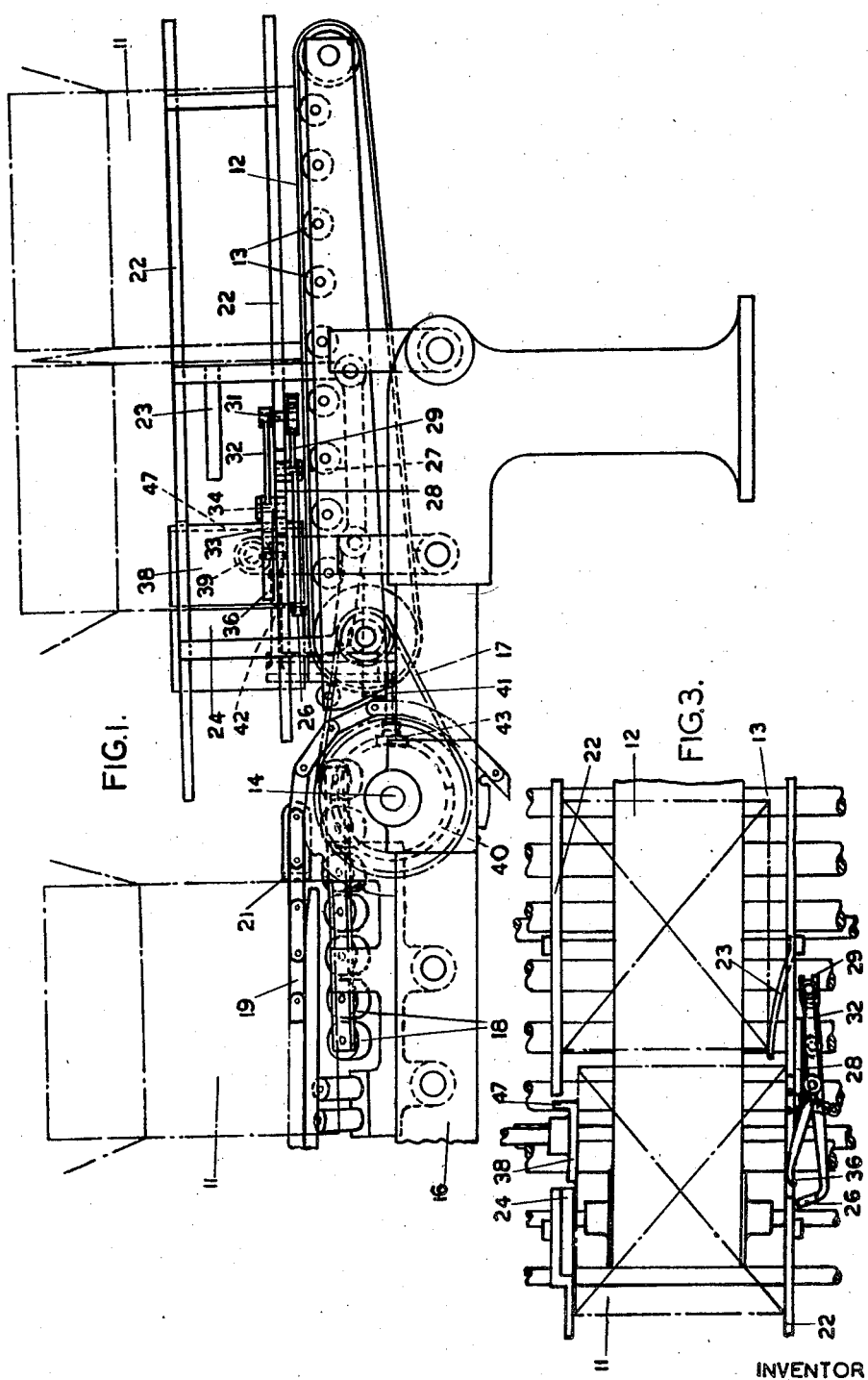

Feb. 13, 1945.   J. A. KAY   2,369,575
MECHANISM FOR FEEDING ARTICLES TO MACHINES
Filed Feb. 5, 1944   3 Sheets-Sheet 2

INVENTOR:
J.A.KAY.
BY
Munn, Liddy & Glaccum
ATTORNEYS

Feb. 13, 1945. J. A. KAY 2,369,575
MECHANISM FOR FEEDING ARTICLES TO MACHINES
Filed Feb. 5, 1944 3 Sheets-Sheet 3

INVENTOR:
J. A. KAY.
BY
Munn, Liddy & Glaccum
ATTORNEYS

Patented Feb. 13, 1945

2,369,575

UNITED STATES PATENT OFFICE 2,369,575

MECHANISM FOR FEEDING ARTICLES TO MACHINES

James Arthur Kay, Gainsborough, England, assignor to Rose Brothers (Gainsborough) Limited, Gainsborough, England, a British company Application February 5, 1944, Serial No. 521,288
In Great Britain February 12, 1943

5 Claims. (Cl. 198—23)

This invention relates to mechanism for feeding articles to machines and more particularly to such mechanism for feeding containers of fibreboard or similar material to a machine for operating on the containers.

The feeding mechanism according to the invention comprises a feed platform (for example, an endless belt) upon which the containers are placed and which is arranged to feed the containers to a machine for operating on the containers, a fixed stop arranged in the path of movement of the containers at one side of the feed platform, means for guiding the containers towards that side of the platform so that the containers successively engage the fixed stop, disengaging means arranged to move the leading container transversely of its normal path of movement and thus free it from engagement with the fixed stop, the disengaging means being arranged to operate in timed relation to the machine aforesaid, a movable stop arranged in the path of movement of the containers at the other side of the feed platform, a movable feeler arranged to be engaged by the side of the container adjacent the movable stop, the movable feeler being connected to the movable stop in such a manner that as the container is moved by the disengaging means it engages the movable feeler which thereupon causes the movable stop to move out of the path of movement of the container, and means for separating the leading container from the next succeeding one so as to allow the movable stop to be returned to its stop position in the path of movement of the containers. The movable stop and movable feeler are preferably pivoted and the movable stop is conveniently spring-urged into the path of movement of the containers.

By way of example, the invention will now be described in greater detail, with reference to the accompanying drawings, as applied to a machine for closing and sealing fibreboard or like containers, the machine being similar to that described in United States Letters Patent No. 2,348,650 to which reference may be made for any details not apparent from the following description.

Figure 2:
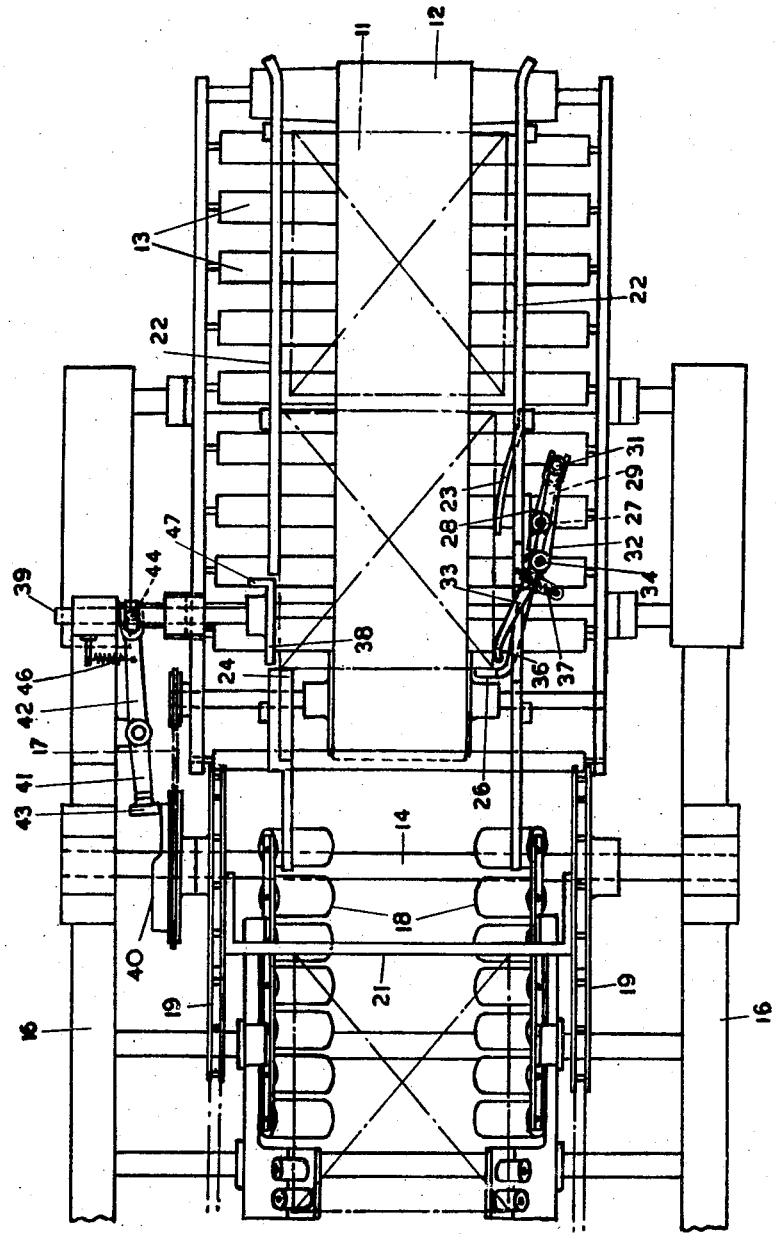
Figure 4:
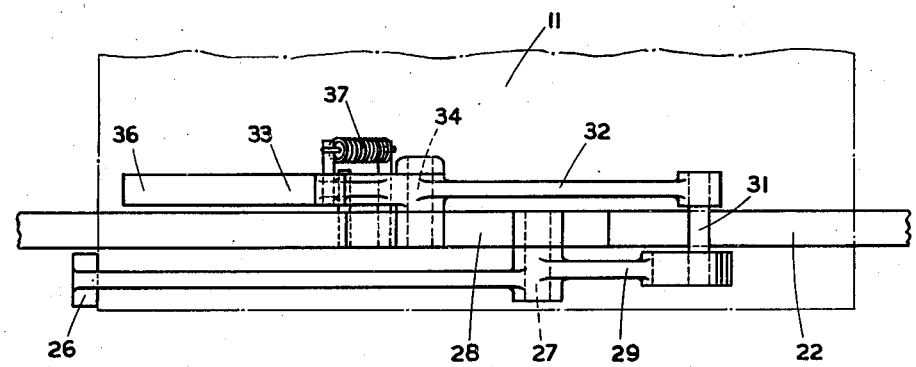
Figure 5:
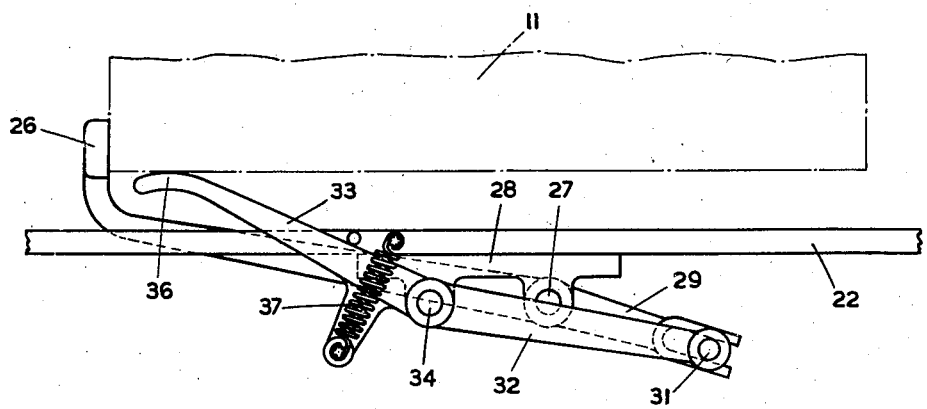

In the drawings,

Figure 1 is an elevation of the feed end of an apparatus for closing and sealing previously filled containers, Figure 2 is a plan view of the apparatus shown in Figure 1, Figure 3 is a plan view similar to Figure 2, showing certain movable parts at a different stage during the progress of the containers through the machine, and Figures 4 and 5 are an enlarged elevation and plan view respectively of a detail of the apparatus.

Referring to the drawings, containers 11 which have been previously filled, for example with small packages, and each of which has its bottom flaps loosely folded to form the base of the container, are placed on a feed belt 12, constituting a feed platform, the upper lap of the belt being supported on a series of freely mounted rollers 13. The feed belt 12 is driven by a shaft 14 suitably mounted in the main framework 16 of the apparatus, through chain and sprocket gearing 17. The feed belt 12 carries the containers 11 forward and deposits them on a support consisting of two sets of inclined rollers 18 disposed in the track of a conveyor consisting of a pair of parallel chains 19 connected by transverse pusher bars 21 which serve to carry the containers through the closing and sealing apparatus.

The feed belt 12 carries the containers 11 between side guides 22 to one of which is attached a leaf spring 23 which urges the containers 11 towards the opposite side guides 22, and as the containers move forward they meet a pair of stops 24 and 26 arranged in the path of movement of the containers (see Figure 2) and being disposed one on each side of the feed belt 12, the stop 24 being disposed on the opposite side of the feed belt 12 to that containing the leaf spring 23, so that the containers are continually urged by the leaf spring towards the side containing the fixed stop 24. The stop 24 is fixed while the stop 26 is pivotally mounted at 27 in a bracket 28 attached to the lower side guide 22 on that side of the machine. The stop 26 is provided with an arm 29 that is short in relation to the distance from the axis of the pivot 27 to the portion of the stop engaging the container 11. The arm 29 is formed with a forked extremity for the accommodation of a pin 31 depending from one arm 32 of a two-armed member 32, 33 pivoted at 34 in the bracket 28. The extremity 36 of the arm 33 constitutes a feeler which is urged into the path of movement of the containers by means of a spring 37 attached at one end to the arm 33 and at the other on the adjacent side guide 22. The arms 32 and 33 are approximately equal, and it will be seen that any movement of the feeler 36 will cause a greater movement of the stop 26 because of the relative shortness of the arm 29. The fixed stop 24 and the movable stop 26 together restrain the containers 11 from forward movement until a lateral pusher 38 moves transversely of the path of the containers to push the leading container clear of the fixed stop 24. The pusher 38 is mounted on a shaft 39 arranged to reciprocate in timed relation to the pusher bars 21 under the influence of a cam 40 and a two-armed lever 41, 42, one arm 41 of which carries a cam roller 43 arranged for engagement with the cam 40, the other arm being formed with a forked extremity for engagement with a pin 44 extending from the shaft 39 carrying the pusher 38. A spring 46 maintains the cam roller 43 in operative engagement with the cam 40.

As the leading container 11 is moved transversely by the pusher 38, it moves into engagement with the feeler 36 which thereupon pivots and causes the pivoted stop 26 to move out of the path of movement of the container so as to allow the feed belt 12 to forward the leading container and deposit it on the inclined rollers 18, the pivoted stop 26 springing back into stop position under the influence of the spring 37 as soon as the container is free of the feeler. The pivoted stop 26 is thus again in position to stop the next succeeding container 11 which, in the meantime, has been arrested by a flange 47 extending from the pusher 38 for the purpose of separating it from the preceding container. The sequence of operations is then repeated.

The timing of the pusher 38 is such that as each container 11 is deposited on the inclined rollers 18 a pusher bar 21 moves up behind the container to carry it through the closing and sealing apparatus.

It will be seen that the provision of the fixed and movable stops 24 and 26 avoids any uneven drag on the container by the feed belt 12, a feature of considerable importance when dealing with containers made from weak board.

I claim:

1. Mechanism for feeding articles to machines comprising a feed conveyor upon which the containers are placed and which is arranged to feed the containers to a machine for operating on the containers, a fixed stop arranged in the path of movement of the containers at one side of the feed conveyor, means for guiding the containers towards that side of the conveyor so that the containers successively engage the fixed stop, disengaging means arranged to move the leading container transversely of its normal path of movement and thus free it from engagement with the fixed stop, the disengaging means being arranged to operate in timed relation to the machine aforesaid, a movable stop arranged in the path of movement of the containers at the other side of the feed conveyor, a movable feeler arranged to be engaged by the side of the container adjacent the movable stop, the movable feeler being connected to the movable stop in such a manner that as the container is moved by the disengaging means it engages the movable feeler which thereupon causes the movable stop to move out of the path of movement of the container, and means for separating the leading container from the next succeeding one so as to allow the movable stop to be returned to its stop position in the path of movement of the containers.

2. Apparatus according to claim 1, wherein the movable stop is pivoted and provided with an arm that is short in relation to the distance from the pivotal axis to the point of engagement between said stop and the container, and wherein the movable feeler is pivoted and provided with an arm of at least the same length as the feeler, said arm being connected to said short arm by a pin and slot connection.

3. Apparatus according to claim 1, wherein the movable feeler and movable stop are springurged into the path of and into contact with the container respectively.

4. Mechanism for feeding articles to machines comprising a feed conveyor upon which the containers are placed and which is arranged to feed the containers to a machine for operating on the containers, a fixed stop arranged in the path of movement of the containers at one side of the feed conveyor, means for guiding the containers towards that side of the conveyor so that the containers successively engage the fixed stop, a reciprocating pusher arranged to move the leading container transversely of its normal path of movement and thus free it from engagement with the fixed stop, the reciprocating pusher being arranged to operate in timed relation to the machine aforesaid, a movable stop arranged in the path of movement of the containers at the other side of the feed conveyor, a movable feeler arranged to be engaged by the side of the container adjacent the movable stop, the movable feeler being connected to the movable stop in such a manner that as the container is moved by the reciprocating pusher it engages the movable feeler which thereupon causes the movable stop to move out of the path of movement of the container, and means for separating the leading container from the next succeeding one so as to allow the movable stop to be returned to its stop position in the path of movement of the containers.

5. Apparatus according to claim 4, wherein said pusher is provided with a flange extending in a direction transverse to the direction of movement of the containers and arranged to arrest each successive container so as to separate it from the preceding one.

JAMES ARTHUR KAY.